United States Patent
Jiang et al.

(10) Patent No.: US 11,363,510 B2
(45) Date of Patent: Jun. 14, 2022

(54) METHOD OF BANDWIDTH PART SWITCHING IN UNPAIRED SPECTRUM, USER EQUIPMENT AND NETWORK DEVICE

(71) Applicant: VIVO MOBILE COMMUNICATION CO., LTD., Chang'an Dongguan (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/652,248

(22) PCT Filed: Oct. 11, 2018

(86) PCT No.: PCT/CN2018/109808
§ 371 (c)(1),
(2) Date: Mar. 30, 2020

(87) PCT Pub. No.: WO2019/095900
PCT Pub. Date: May 23, 2019

(65) Prior Publication Data
US 2020/0245207 A1    Jul. 30, 2020

(30) Foreign Application Priority Data
Nov. 14, 2017    (CN) .......................... 201711122345.4

(51) Int. Cl.
*H04W 4/00*    (2018.01)
*H04W 36/06*    (2009.01)
(Continued)

(52) U.S. Cl.
CPC .......... *H04W 36/06* (2013.01); *H04L 5/0007* (2013.01); *H04L 5/1469* (2013.01); *H04W 36/24* (2013.01); *H04W 72/1289* (2013.01)

(58) Field of Classification Search
USPC ................................ 370/328, 329, 330, 331
See application file for complete search history.

(56) References Cited

U.S. PATENT DOCUMENTS

| 2015/0215825 A1 | 7/2015 | Kim et al. |
| 2019/0037566 A1 | 1/2019 | Zhang et al. |

(Continued)

FOREIGN PATENT DOCUMENTS

| CN | 102164416 A | 8/2011 |
| CN | 104704881 A | 6/2015 |

(Continued)

OTHER PUBLICATIONS

Extended European Search Report for related Application No. 18878580.2; dated Oct. 23, 2020.

(Continued)

*Primary Examiner* — David Q Nguyen
(74) *Attorney, Agent, or Firm* — von Briesen & Roper, s.c.

(57) ABSTRACT

A method of BWP switching in unpaired spectrum, a UE and a network device are provided. The method of BWP switching in unpaired spectrum includes: when first DCI for scheduling a PDSCH is not detected, resetting a timer in accordance with detected second DCI for scheduling a PUSCH; and when a reset timer is expired, switching a current BWP to a default BWP.

20 Claims, 3 Drawing Sheets

(51) Int. Cl.
*H04L 5/00* (2006.01)
*H04L 5/14* (2006.01)
*H04W 36/24* (2009.01)
*H04W 72/12* (2009.01)

(56) References Cited

U.S. PATENT DOCUMENTS

| | | | |
|---|---|---|---|
| 2019/0059112 A1* | 2/2019 | Ou | H04W 74/008 |
| 2019/0098612 A1* | 3/2019 | Babaei | H04W 72/1289 |
| 2019/0141742 A1* | 5/2019 | Zhou | H04W 24/00 |
| 2020/0404617 A1* | 12/2020 | Murray | H04W 52/0229 |
| 2021/0167930 A1* | 6/2021 | Jeon | H04L 5/0094 |
| 2021/0204221 A1* | 7/2021 | Zhou | H04W 52/146 |

FOREIGN PATENT DOCUMENTS

| | | |
|---|---|---|
| CN | 106961731 A | 7/2017 |
| WO | WO 2015/185256 A1 | 12/2015 |

OTHER PUBLICATIONS

Mediatek Inc., "Summary of Bandwidth Part Operation", Oct. 9-13, 2017, 3GPP TSG RAN WG1 Meeting 90bis, Prague, CZ.
First Chinese Office Action Application No. 201711122345.4; dated May 7, 2020.
Mediatek Inc.; "Remaining Details on Bandwidth Part Operation in NR" 3GPP TSG RAN WG1 Meeting 90bis; R1-1718327; Prague, CZ, Oct. 9, 2017-Oct. 13, 2017.
Ericsson; "On Bandwidth parties"; 3GPP TSG-RAN WG1 90bis; R1-1718523; Prague, Czech Republic, Oct. 9, 2017-Oct. 13, 2017.
Intel Corporation; "Overall impact in RAN2 for BWP", 3GPP TSG RAN WG2 Meeting: #99bis, R2-1710592, Prague, Czech Republic, Oct. 9, 2017-Oct. 13, 2017.
Samsung; "Timer-based BWP switching", 3GPP TSG-RAN WG2 NR #99bis Meeting; R2-1711199, Prague, Czech Republic, Oct. 9, 2017-Oct. 13, 2017.
Indian Office Action related to Indian Application No. 202027017050; dated May 18, 2021.
Japanese Office Action related to Japanese Application No. 2020-522860; dated June 23, 2021.
Guangdong OPPO Mobile Telecom; R1-1715692; Remaining issues on bandwidth part configuration and activation, 6.3.4;3GPP TSG RAN WG1 Meeting NR#3; Nagoya, Japan, Sep. 18-21, 2017.
MediaTek Inc.; R1-1716202; Remaining Details on Bandwidth Part Operation in NR Document for: Discussion, 6.3.4; 3GPP TSG RAN WG1 Meeting NR#3; Nagoya, Japan, Sep. 18-21, 2017.
Vivo; R1-1719800; Other aspects on bandwidth Parts, 7.3.4.1; 3GPP TSG RAN WG1 Meeting 91; Reno, USA, Nov. 27-Dec. 1, 2017.

* cited by examiner when first DCI for scheduling a PDSCH and second DCI for scheduling a PUSCH are not transmitted to a UE within a predetermined quantity of consecutive time-domain transmission units, scheduling a next PUSCH to a default BWP of the UE — 51

METHOD OF BANDWIDTH PART SWITCHING IN UNPAIRED SPECTRUM, USER EQUIPMENT AND NETWORK DEVICE

CROSS-REFERENCE TO RELATED APPLICATION

This patent application is a 35 USC § 371 U.S. national stage of International Application No. PCT/CN2018/109808 filed on Oct. 11, 2018, which claims a priority of the Chinese Patent Application No. 201711122345.4, filed on Nov. 14, 2017, which are incorporated herein by reference in their entireties.

TECHNICAL FIELD

The present disclosure relates to the field of communication technology, in particular to a method of Bandwidth Part (BWP) switching in unpaired spectrum, a User Equipment (UE) and a network device.

BACKGROUND

As compared with a previous mobile communication system, a coming $5^{th}$-Generation (5G) mobile communication system, also called as New Radio (NR) system, needs to be adapted to more diversified scenarios and service requirements. Principal scenarios of the 5G mobile communication system includes Enhanced Mobile Broadband (eMBB), massive Machine Type of Communication (mMTC) and Ultra Reliable & low Latency Communication (URLLC), and the system is highly demanded in these scenarios in terms of high reliability, low latency, large broadband and wide coverage. In order to meet the requirements on different services and different scenarios, a subcarrier spacing in the NR system is not the same as that in a conventional $4^{th}$-Generation (4G) mobile communication system (also called as Long Term Evolution (LTE) system) where a single subcarrier spacing at 15 kHz is adopted. The NR system may support various subcarrier spacings, and different subcarrier spacings may be applied to different scenarios. For example, a larger subcarrier spacing may be provided with respect to scenario at a high frequency and with large bandwidth. In addition, the large subcarrier spacing corresponds to a small symbol length in a time domain, so it is able to meet the requirement of a low latency service.

In the NR system, a channel bandwidth of each carrier is up to 400 MHz, but due to the UE capability, a maximum bandwidth supported by a UE may be smaller than 400 MHz. In addition, the UE may operate at a plurality of small BWPs, and each BWP corresponds to one respective numerology, one respective bandwidth and one respective frequency location. In a Frequency Division Duplexing (FDD) system or a paired spectrum system, at most four downlink (DL) BWPs and at most four uplink (UL) BWPs are configured by a network device for the UE. In a Time Division Duplexing (TDD) system or an unpaired spectrum system, at most four DL/UL BWP pairs are configured by the network device for the UE, and the DL BWP and the UL BWP in each DL/UL BWP pair have a same central carrier frequency. It should be appreciated that, each UE is configured with a default DL BWP or a default DL/UL BWP pair. Usually, the default DL BWP is a BWP having a relatively small bandwidth or the default DL/UL BWP pair consists of BWPs each having a relatively small bandwidth. When the UE fails to receive data or detect a Physical Downlink Control Channel (PDCCH) for a long time period, the UE may switch a current active BWP to the default DL BWP or the default DL/UL BWP pair based on a timer, so as to save power.

When the UE is switched from the current active BWP to a DL BWP different from the default DL BWP, the timer is started by the UE. When Downlink Control Information (DCI) for a Physical Downlink Shared Channel (PDSCH) has been successfully demodulated by the UE, the timer is restarted and reset to an initial value by the UE. When the timer is expired, the UE is switched to the default DL BWP. For the unpaired spectrum system, each DL BWP may correspond to one respective UL BWP, and when the DL BWP is to be switched, the corresponding UL BWP needs to be switched together. However, the PDSCH is scheduled in advance, i.e., a UL grant needs to be transmitted within a slot earlier than the data transmission by K slots. At this time, the UE probably fails to schedule any downlink data within a certain time period, so the UE needs to be switched to the default DL BWP due to the expiration of the timer and the UL BWP needs to be switched together. However, when the delay K is not met but the timer is expired, it is impossible to perform the uplink scheduling if the UL BWP is switched together with the DL BWP.

SUMMARY

In one aspect, the present disclosure provides in some embodiments a method of BWP switching in unpaired spectrum for a UE, including: when first DCI for scheduling a PDSCH is not detected, resetting a timer in accordance with detected second DCI for scheduling a PUSCH; and when a reset timer is expired, switching a current BWP to a default BWP.

In another aspect, the present disclosure provides in some embodiments a UE, including: a resetting module used to, when first DCI for scheduling a PDSCH is not detected, reset a timer in accordance with detected second DCI for scheduling a PUSCH; and a first switching module used to, when a reset timer is expired, switch a current BWP to a default BWP.

In yet another aspect, the present disclosure provides in some embodiments a UE, including a processor, a memory, and a computer program stored in the memory and executed by the processor. The processor is used to execute the computer program implement the above-mentioned method of BWP switching in unpaired spectrum.

In still yet another aspect, the present disclosure provides in some embodiments a method of BWP switching in unpaired spectrum for a network device, including, when first DCI for scheduling a PDSCH and second DCI for scheduling a PUSCH are not transmitted to a UE within a predetermined quantity of consecutive time-domain transmission units, scheduling a next PUSCH to a default BWP of the UE.

In still yet another aspect, the present disclosure provides in some embodiments a network device, including a scheduling module used to, when first DCI for scheduling a PDSCH and second DCI for scheduling a PUSCH are not transmitted to a UE within a predetermined quantity of consecutive time-domain transmission units, schedule a next PUSCH to a default BWP of the UE.

In still yet another aspect, the present disclosure provides in some embodiments a network device, including a processor, a memory, and a computer program stored in the memory and executed by the processor. The processor is used to execute the computer program implement the above-mentioned method of BWP switching in unpaired spectrum.

In still yet another aspect, the present disclosure provides in some embodiments a computer-readable storage medium storing therein a computer program. The computer program is executed by a processor, implement the above-mentioned method of BWP switching in unpaired spectrums.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
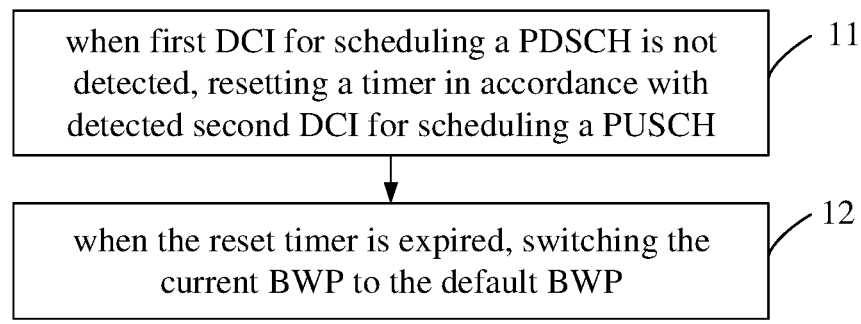
FIG. 1 is a flow chart of a method of BWP switching in unpaired spectrum for a UE according to one embodiment of the present disclosure.

The present disclosure will be described hereinafter in details in conjunction with the drawings and embodiments. It should be appreciated that, although the drawings shows embodiments of the present disclosure, the following embodiments are for illustrative purposes only, but shall not be used to limit the scope of the present disclosure. Actually, the embodiments are provided so as to facilitate the understanding of the scope of the present disclosure, and to convey the scope of the present disclosure to a person skilled in the art in a complete manner.

Such words as "first" and "second" involved in the specification and the appended claims are merely used to differentiate similar objects rather than to represent any specific order or sequence. It should be appreciated that, the data used in this way may be replaced with each other, so as to further implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, product or device.

The present disclosure provides in some embodiments a method of BWP switching in unpaired spectrum for a UE which, as shown in FIG. 1, includes the following steps.

Step 11: when first DCI for scheduling a PDSCH is not detected, resetting a timer in accordance with detected second DCI for scheduling a PUSCH.

Figure 2:
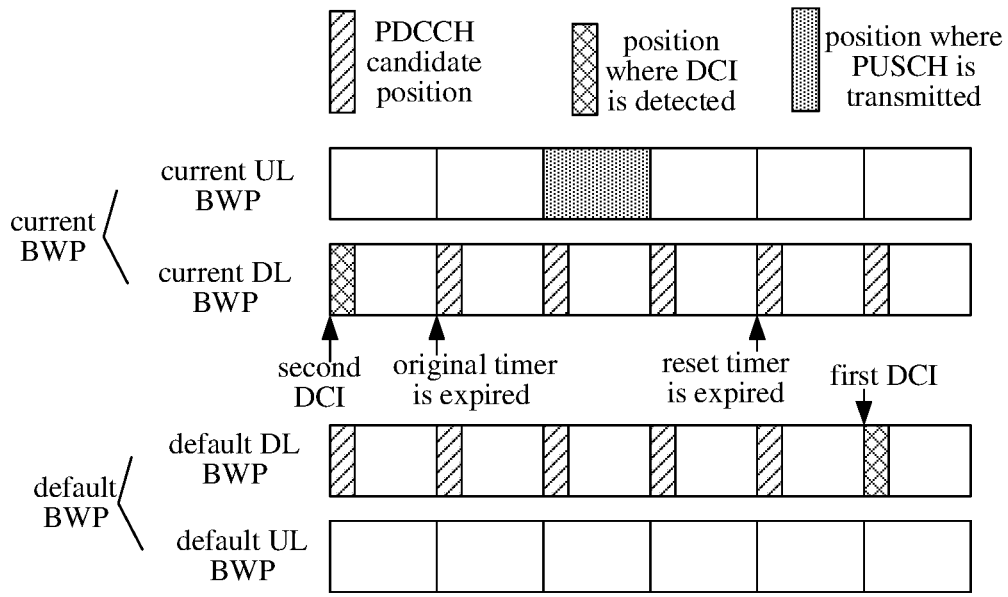
FIG. 2 is a schematic view showing a situation where a BWP is switched according to one embodiment of the present disclosure.

The first DCI and the second DCI may be transmitted through a PDCCH. Upon the detection of the first DCI for scheduling the PDSCH, the UE may reset the timer. To be specific, upon the UE detects the first DCI for scheduling the PDSCH, the UE may reset the timer to an initial value, i.e., restart the timer. When the first DCI for scheduling the PDSCH has not been detected yet by the UE, the timer may continue to operate (it may be incremented or decremented by one). When the UE fails to detect the first DCI and the second DCI within a time period between a time when the timer is started and a time when the timer is expired, the UE may be switched from a current BWP to a default BWP, so as to save power. As shown in FIG. 2, when the timer of the UE is about to expire within a second time-domain transmission unit (e.g., slot) and the UE fails to detect the first DCI and the second DCI within a first slot and a second slot, the UE may be switched from the current BWP to the default BWP after the second slot. The current BWP may be one of the BWPs corresponding to the UE other than the default BWP. The time-domain transmission unit may include one of a frame, a slot, a mini-slot and a time-domain transmission symbol (an Orthogonal Frequency Division Multiplexing (OFDM) symbol), and here the slot may be taken as an example. When the UE has detected the second DCI within the first slot and a conventional BWP switching mechanism is adopted currently, uplink scheduling corresponding to the second DCI detected by the UE may be invalid scheduling. In the embodiments of the present disclosure, in this scenario, the timer may be reset, and a to-be-reset value of the timer may be determined in accordance with a time when the second DCI is detected, a relationship among an initial value, a current value and a time-out value of the timer, a time duration for waiting and transmitting the PUSCH, so as to prevent the failure of the uplink scheduling.

Step 12: when the reset timer is expired, switching the current BWP to the default BWP.

As shown in FIG. 2, the timer of the UE is about to expire within the second slot. When the second DCI is detected by the UE within the first slot, the timer may reset. When the transmission of the PUSCH has been completed and the reset timer is expired, the UE may be switched from the current BWP to the default BWP. The timer may be reset by the UE so as to prevent the failure of the uplink scheduling corresponding to the second DCI from being detected during the operation of the timer. After the timer has been reset, it is able to ensure the completion of the uplink scheduling corresponding to the second DCI. The UE may switch the current BWP to the default BWP after the expiration of the timer, so as to ensure the normal uplink transmission of the UE at the current BWP.

When the second DCI is detected, the UE may further determine whether it is necessary to reset the timer in accordance with a relationship between a difference between the current value of the timer and the time-out value of the timer and the time duration for waiting and transmitting the PUSCH. To be specific, Step 11 may include, when the second DCI is detected and the difference between the current value of the timer and the time-out value of the timer is smaller than the time duration for waiting and transmitting the PUSCH, resetting the timer. In other words, when it is impossible to ensure the normal transmission of the PUSCH scheduled by the second DCI within a time period from the current value of the timer to the time-out value of the timer, the UE needs to reset the timer. Further, when the second DCI is detected and the difference between the current value of the timer and the time-out value of the timer is greater than or equal to the time duration for waiting and transmitting the PUSCH, it is unnecessary to reset the timer. In other words, when it is able ensure the normal transmission of the PUSCH scheduled by the second DCI within a time period from the current value of the time-out value of the timer, the UE does not need to reset the timer.

To be specific, when it is necessary to reset the timer, the timer may be reset in the following modes.

Mode 1: the current value of the timer may be rolled back a first predetermined quantity of time-domain transmission units.

The first predetermined quantity may be a smaller one of a first value and a second value. The first value may be a difference between the current value and the initial value of the timer, and the second value may be the quantity of the time-domain transmission units within the time duration for waiting and transmitting the PUSCH. It is presumed that the timer includes T time-domain transmission units. When the second DCI for scheduling the PUSCH is detected, the current value of the timer may be t, and the timer may count in a descending order. When t is greater than or equal to the time duration (M+N) for waiting and transmitting the PUSCH, it is unnecessary to reset the timer. When t is smaller than (M+N), it is necessary to reset the timer. To be specific, the value of the timer may be directly reset to the initial value, i.e., the timer may be restarted; or the value of the timer may be directly rolled back min{M+N, T−t}. Alternatively, when the second DCI for scheduling the PUSCH is detected, the current value of the timer may be t', and the timer may count in an ascending order. When T−t' is greater than or equal to (M+N), it is unnecessary to reset the timer, and T−t' is smaller than (M+N), it is necessary to reset the timer. To be specific, the value of the timer may be directly reset to the initial value, i.e., the timer may be restarted; or the value of the timer may be directly rolled back min{M+N, T−t'}.

In a possible embodiment of the present disclosure, the first predetermined quantity may be greater than or equal to a difference between a second value and a third value. The second value may be the quantity of the time-domain transmission units within the time duration for waiting and transmitting the PUSCH, and the third value may be a difference between the current value of the timer and the time-out value of the timer. It is presumed that the timer includes T time-domain transmission units. When the second DCI for scheduling the PUSCH is detected, the current value of the timer may be t, and the timer may count in a descending order. When t is greater than or equal to the time duration (M+N) for waiting and transmitting the PUSCH, it is unnecessary to reset the timer. When t is smaller than (M+N), it is necessary to reset the timer. To be specific, the value of the timer may be directly rolled back at least (M+N−t) time-domain transmission units. Alternatively, when the second DCI for scheduling the PUSCH is detected, the current value of the timer may be t', and the timer may count in an ascending order. When T−t' is greater than or equal to (M+N), it is unnecessary to reset the timer, and T−t' is smaller than (M+N), it is necessary to reset the timer. To be specific, the value of the timer may be rolled back at least (M+N−T+t') time-domain transmission units.

It should be appreciated that, when the timer has been reset, the UE may continue to detect the first DCI and the second DCI. When the first DCI is detected, the timer may be restored to the initial value, i.e., the timer may be restarted. When the first DCI fails to be detected, the timer may continue to operate (i.e., the value of the timer may be incremented or decremented by one). Further, when the first DCI fails to be detected and the second DCI is detected, the timer may be reset in accordance with Mode 1.

Mode 2: when the timer is expired, the time-out value of the timer may be rolled back a second predetermined quantity of time-domain transmission units.

The second predetermined quantity may be greater than or equal to a difference between a second value and a third value. The second value may be the quantity of the time-domain transmission units within the time duration for waiting and transmitting the PUSCH, and the third value may be a difference between the current value of the timer and the time-out value of the timer. When the timer is expired and there is uplink data for the UE that has been scheduled but has not been transmitted yet, the UE may wait for the second predetermined quantity of time-domain transmission units on the basis of the expiration of the timer, and then be switched from the current BWP to the default BWP, so as to ensure the normal transmission of the scheduled uplink data. The second predetermined quantity may be determined in accordance with the time duration (M+N) for waiting and transmitting the PUSCH and a difference between a time when the second DCI is detected (i.e., the current value of the timer) and the time-out value of the timer. Here, during the switching of the BWP by the UE, the uplink scheduling before the expiration of the timer, rather than the uplink scheduling within a waiting time period after the expiration of the timer, may be taken into consideration. To be specific, after the expiration of the timer, the UE may not detect any information from the network device, including the first DCI and the second DCI, any more.

It should be appreciated that, the second value may be a sum of the quantity of time-domain transmission units between the second DCI and the scheduled PUSCH (i.e., the time duration M for waiting the PUSCH) and the quantity of time-domain transmission units occupied by the PUSCH (i.e., time duration N for transmitting the PUSCH). For example, for single-subframe scheduling in the LTE system, an uplink scheduling delay K may be 4, i.e., M=3 and N=1.

Further, the method of BWP switching in unpaired spectrum may further include, when the first DCI fails to be detected, the second DCI is detected and it is detected that the second DCI indicates that the PUSCH is mapped to the default BWP, enabling the timer to operate continuously, and when the timer is expired, switching the current BWP to the default BWP. In other words, when the UE fails to detect the first DCI but has detected the second DCI during the operation of the timer, it is necessary to determine whether the BWP mapped to the PUSCH scheduled by the second DCI is the current BWP or the default BWP. When the BWP is the current BWP, the UE may determine whether it is necessary to reset the timer as mentioned hereinabove, and when the BWP is the default BWP, the UE may be directly be switched from the current BWP to the default BWP after the expiration of the timer. In this way, no matter whether the uplink scheduling is mapped to the current BWP or the default BWP, it is able for the UE to ensure the normal transmission of the scheduled uplink data.

According to the method of BWP switching in unpaired spectrum in the embodiments of the present disclosure, the UE may reset the timer in accordance with the first DCI for scheduling the PDSCH and the second DCI for scheduling the PUSCH, so as to prevent the uplink scheduling from being confused due to the switching of the BWP, thereby to ensure the normal uplink transmission of the UE during the switching of the BWP.

The method of BWP switching in unpaired spectrum has been described hereinabove in different scenarios, and the corresponding UE will be described hereinafter in conjunction with the drawings.

Figure 3:
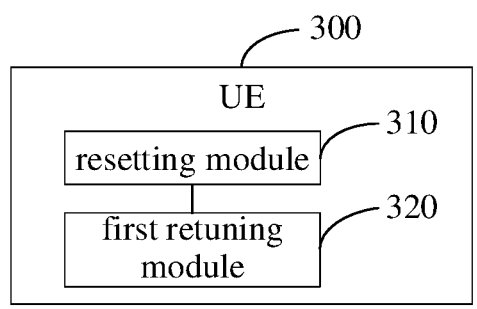
FIG. 3 is a schematic view showing the UE according to one embodiment of the present disclosure.

As shown in FIG. 3, the present disclosure further provides in some embodiments a UE 300 capable of implementing the above-mentioned method of BWP switching in unpaired spectrum, i.e., resetting the timer in accordance with a detected second DCI for scheduling a PUSCH when first DCI for scheduling a PDSCH has not been detected, and switching a current BWP to a default BWP when the reset timer is expired, with a same technical effect. The UE 300 may include: a resetting module 310 used to, when first DCI for scheduling a PDSCH is not detected, reset a timer in accordance with detected second DCI for scheduling a PUSCH; and a first switching module 320 used to, when the reset timer is expired, switch a current BWP to a default BWP.

The resetting module 310 may include a first resetting sub-module used to, when the second DCI is detected and a difference between a current value of the timer and a time-out value of the timer is smaller than a time duration for waiting and transmitting the PUSCH, reset the timer.

The resetting module 310 may further include a second resetting sub-module used to roll back the current value of the timer a first predetermined quantity of time-domain transmission units. The first predetermined quantity may be a first value and a second value, the first value may be a difference between the current value of the timer and an initial value of the timer, and the second value may be the quantity of time-domain transmission units in the time duration for waiting and transmitting the PUSCH, or the first predetermined quantity may be greater than or equal to a difference between the second value and a third value, and the third value may be a difference between the current value of the timer and the time-out value of the timer.

The resetting module 310 may further include a third resetting sub-module used to, when the timer is expired, roll back the time-out value of the timer a second predetermined quantity of time-domain transmission units. The second predetermined quantity may be greater than or equal to a difference between a second value and a third value, the second value may be the quantity of time-domain transmission units in the time duration for waiting and transmitting the PUSCH, and the third value may be a difference between the current value of the timer and the time-out value of the timer.

The second value may be a sum of the quantity of time-domain transmission units between the second DCI and the scheduled PUSCH, and the quantity of time-domain transmission units occupied by the PUSCH.

The time-domain transmission unit may include one of a subframe, a slot, a mini-slot and a time-domain transmission symbol.

The UE 300 may further include: a timing module used to, when it is detected that the second DCI indicates that the PUSCH is mapped to the default BWP, keep the timer going; and a second switching module used to, when the timer is expired, switch the current BWP to the default BWP.

It should be appreciated that, according to the embodiments of the present disclosure, the UE may reset the timer in accordance with the first DCI for scheduling the PDSCH and the second DCI for scheduling the PUSCH, so as to prevent the uplink scheduling from being confused due to the switching of the BWP, thereby to ensure the normal uplink transmission of the UE during the switching of the BWP.

Figures 4, 5:
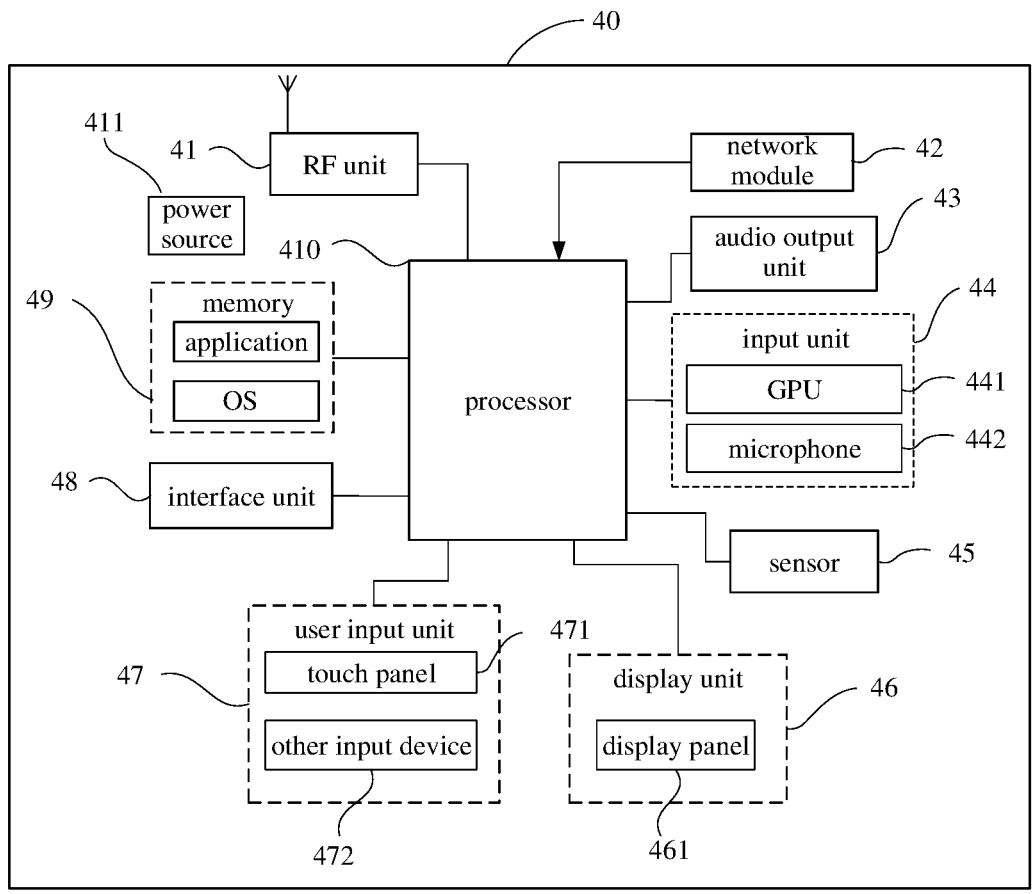
FIG. 4 is a block diagram of the UE according to one embodiment of the present disclosure.
FIG. 5 is a flow chart of a method of BWP switching in unpaired spectrum for a network device according to one embodiment of the present disclosure.

In order to achieve the above object in a better manner, the present disclosure further provides in some embodiments a UE 40 which, as indicated by the hardware shown FIG. 4, includes, but not limited to, an RF unit 41, a network module 42, an audio output unit 43, an input unit 44, a sensor 45, a display unit 46, a user input unit 47, an interface unit 48, a memory 49, a processor 410, and a power source 411. It should be appreciated that, the structure in FIG. 4 shall not be construed as limiting the UE. The UE may include more or fewer members, or some members may be combined, or the UE may include some other members not shown in FIG. 4. In the embodiments of the present disclosure, the UE may include, but not limited to, mobile phone, flat-panel computer, laptop computer, Personal Digital Assistant (PDA), vehicle-mounted terminal, wearable device or pedometer.

The RF unit 41 is used to receive and transmit data under the control of the processor 410. The processor 410 is used to: when first DCI for scheduling a PDSCH fails to be detected, reset a timer in accordance with detected second DCI for scheduling a PUSCH; and when the reset timer is expired, switch a current BWP to a default BWP.

According to the embodiments of the present disclosure, the UE may reset the timer in accordance with the first DCI for scheduling the PDSCH and the second DCI for scheduling the PUSCH, so as to prevent the uplink scheduling from being confused due to the switching of the BWP, thereby to ensure the normal uplink transmission of the UE during the switching of the BWP.

It should be appreciated that, in the embodiments of the present disclosure, the RF unit 41 is used to transmit and receive signals during the information transmission or phone call. To be specific, the RF unit 41 may, upon the receipt of downlink data from a base station, transmit the downlink data to the processor 410 for subsequent treatment. In addition, the RF unit 41 may transmit uplink data to the base station. Usually, the RF unit 41 may include, but not limited to, an antenna, at least one amplifier, a transceiver, a coupler, a low-noise amplifier and a duplexer. In addition, the RF unit 41 may communicate with a network and the other devices via a wireless communication system.

The network module 42 is used to enable the UE to access the broadband Internet in a wireless manner, e.g., help a user to receive and send an e-mail, browse a web page or access a streaming media.

The audio output unit 43 is used to convert audio data received by the RF unit 41 or the network module 42, or audio data stored in the memory 49, into an audio signal and output the audio signal as a sound. In addition, the audio output unit 43 is further used to provide an audio output related to a specific function executed by the UE 40 (e.g., a sound occurring when a calling signal or a message has been received). The audio output unit 43 may include a loudspeaker, a buzzer and a receiver.

The input unit 44 is used to receive an audio or video signal. It may include a Graphics Processing Unit (GPU) 441 and a microphone 442. The GPU 441 is used to process image data of a static image or video acquired by an image collection unit (e.g., a camera) in a video capturing mode or an image capturing mode, and a processed image frame may be displayed by the display unit 46. The image frame processed by the GPU 441 may be stored in the memory 49 (or any other storage medium) or transmitted via the RF unit 41 or network module 42. The microphone 442 is used to receive a sound, and convert the sound into voice data. In a call mode, the processed audio data may be converted into data in a format capable of being transmitted by the RF unit 41 to a mobile communication base station.

The UE may further include at least one sensor 45, which may include a light sensor, a movement sensor and the other sensors. To be specific, the light sensor may include an ambient light sensor or a proximity sensor. The ambient light sensor is used to adjust a brightness value of a display panel 461 in accordance with ambient light. The proximity sensor is used to turn off the display panel 461 and/or a backlight source when the UE 40 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 45 may further include a fingerprint sensor, a pressure sensor, an iris sensor, a molecule sensor, a gyroscope, a barometer, a hygrometer, a thermometer or an infrared sensor, which will not be particularly defined herein.

The display unit 46 is used to display information inputted by the user or provided to the user. The display unit 46 may include the display panel 461, e.g., a Liquid Crystal Display (LCD) panel, or an Organic Light-Emitting Diode (OLED) panel.

The user input unit 47 is used to receive digital or character information inputted by the user, and generate a key signal input related to user settings and function control of the UE. To be specific, the user input unit 47 may include a touch panel 471 and an input device 472. The touch panel 471, also called as touch screen, is used to collect a touch operation made by the user on or in proximity to the touch panel (e.g., an operation made by the user through any appropriate object or attachment (e.g., finger or stylus) on or in the proximity to the touch panel 471). The touch panel 471 may include a touch detection unit and a touch controller. The touch detection unit is used to detect a touch position and a signal generated due to the touch operation, and transmit the signal to the touch controller. The touch controller is used to receive touch information from the touch detection unit, convert it into coordinates of a touch point, transmit the coordinates to the processor 410, and receive and execute a command from the processor 410. In addition, the touch panel 471 may be of a resistive type, a capacitive type, an infrared type or a Surface Acoustic Wave (SAW) type. The user input unit may further includes another input device 472, which may include, but not limited to, a physical keyboard, a functional button (e.g., a volume control button or an on/off button), a trackball, a mouse, and a joystick, which will not be particularly defined herein.

Further, the touch panel 471 may cover the display panel 461. When the touch operation made on or in proximity to the touch panel 471 is detected by the touch panel 471, the touch panel 471 may transmit the touch information to the processor 410, so as to determine a type of a touch event. Then, the processor 410 may control the display panel 461 to provide a corresponding visual output on the display panel 461 in accordance with the type of the touch event. Although the touch panel 471 and the display panel 461 are configured as two separate members in FIG. 4 to achieve the input and output functions of the UE, in some embodiments of the present disclosure, they may be integrated so as to achieve the input and output functions of the UE, which will not be particularly defined herein.

The interface unit 48 is used to provide an interface between an external device and the UE 40. For example, the external device may include a wired or wireless headset port, an external power source port (or a charging port), a wired or wireless data port, a memory card port, a port for a device having an identification module, an audio Input/Output (I/O) port, a video I/O port, and an earphone port. The interface unit 48 is used to receive an input from the external device (e.g., data information and electricity) and transmit the input to one or more elements of the UE 40, or transmit data between the UE 40 and the external device.

The memory 49 is used to store therein a software application and various data. It may mainly include an application storage area and a data storage area. An Operating System (OS) and at least one application for the functions (e.g., an audio/image playing function) may be stored in the application storage area. Data created in accordance with the operation of the mobile phone (e.g., audio data and textbook) may be stored in the data storage area. In addition, the memory 49 may include a high-speed Random Access Memory (RAM), or a non-volatile memory (e.g., at least one magnetic disk or flash memory), or any other volatile solid state memory.

As a control center of the UE, the processor 410 may be connected to the other members of the UE via various interfaces and circuits, and used to run or execute the software program and/or module stored in the memory 49, and call the data stored in the memory 49, so as to execute the functions of the UE and process the data, thereby to monitor the entire UE. The processor 410 may include one or more processing units. In a possible embodiment of the present disclosure, an application processor and a modem may be integrated into the processor 410. The application processor is mainly used to process the operating system, a user interface, the application, and the like. The modem is mainly used to process wireless communication. It should be appreciated that, the modem may also not be integrated into the processor 1610.

The power source 411 (e.g., a battery) is used to supply power to the members of the UE 40. In a possible embodiment of the present disclosure, the power source 411 is logically connected to the processor 410 via a power source management system, so as to achieve such functions as charging, discharging and power consumption management through the power source management system.

In addition, the UE 40 may include some functional modules not shown in FIG. 4, which will not be particularly defined herein.

The present disclosure further provides in some embodiments a UE which includes a processor 410, a memory 49, and a computer program stored in the memory 49 and executed by the processor 410. The processor 410 is used to execute the computer program so as to implement the above-mentioned method of BWP switching in unpaired spectrum with a same technical effect, which will not be particularly defined herein. The UE may be a wireless UE or a wired UE. The wireless UE may be a device capable of providing voice data and/or any other service data to a user, e.g., a handheld device having a wireless connection function, or any other processing device capable of being connected to a wireless modem. The wireless UE may communicate with one or more core networks via a Radio Access Network (RAN). The wireless UE may be a mobile terminal, e.g., a mobile phone (or cellular phone), or a computer having the mobile terminal, e.g., a portable, pocket-sized, handheld, built-in or vehicle-mounted mobile device, which are capable of exchanging voice and/or data with the RAN. For example, the wireless UE may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal may also be called as system, subscriber unit, subscriber station, mobile station, mobile, remote station, remote terminal, access terminal, user terminal, user agent or user device, which will not be particularly defined herein.

The present disclosure further provides in some embodiments a computer-readable storage medium storing therein a computer program. The computer program is executed by a processor so as to implement the above-mentioned method of BWP switching in unpaired spectrum with a same technical effect, which will not be particularly defined herein. The computer-readable storage medium may be a Read-Only Memory (ROM), a Random Access Memory (RAM), a magnetic disk or an optical disk.

The method of BWP switching in unpaired spectrum for the UE has been described hereinabove, and a method of BWP switching in unpaired spectrum for the network device will be described hereinafter in conjunction with the drawings.

As shown in FIG. 5, the present disclosure provides in some embodiments a method of BWP switching in unpaired spectrum for a network device which includes Step 51 of, when first DCI for scheduling a PDSCH and second DCI for scheduling a PUSCH are not transmitted to a UE within a predetermined quantity of consecutive time-domain transmission units, scheduling a next PUSCH to a default BWP of the UE.

The predetermined quantity may be a value pre-defined in a protocol or by the network device, or a difference between the quantity of time-domain transmission units in a timer of the UE and the quantity of time-domain transmission units in a time duration for waiting and transmitting the PUSCH. To be specific, it is presumed that the timer includes T time-domain transmission units, and the time duration for waiting and transmitting the PUSCH is (M+N). The quantity of the time-domain transmission units in the time duration for waiting and transmitting the PUSCH may include a sum of the quantity of time-domain transmission units between the scheduled PUSCH and the detected PDCCH (i.e., a scheduling delay M of the PUSCH) and the quantity of time-domain transmission units occupied by the PUSCH (i.e., a time duration N for transmitting the PUSCH). In other words, there is no downlink scheduling or uplink scheduling within T-M-N slots for the network device. When it is necessary to perform the uplink scheduling within last (M+N) slots of the timer, the network device may directly schedule the PUSCH to the default BWP, so as to ensure that the scheduled PUSCH may be still transmitted at the default BWP when the timer of the UE is expired and the current BWP has been switched to the default BWP. It should be appreciated that, the numerology of the current BWP may be different from the numerology of the default BWP, and at this time, it is necessary to take a maximum scheduling delay M of the PUSCH into consideration. The time-domain transmission unit may include one of a subframe, a slot, a mini-slot and a time-domain transmission symbol. In the embodiments of the present disclosure, the slot may be taken as an example.

To be specific, the network device may schedule the next PUSCH to the default BWP through the current BWP or the default BWP. Step 51 may include, when the UE has been switched from the current BWP to the default BWP, transmitting the second DCI for scheduling the next PUSCH to the default BWP to the UE through the default BWP. In other words, there is no downlink scheduling or uplink scheduling within T-M-N slots for the network device. When it is necessary to perform the uplink scheduling within the last (M+N) slots of the timer, the network device may not schedule the PUSCH within the subsequent M+N slots any more, and instead, after the timer of the UE is expired, the network device may schedule the next PUSCH through the default BWP. Alternatively, Step 51 may include transmitting the second DCI for scheduling the next PUSCH to the default BWP to the UE through the current BWP. In other words, there is no downlink scheduling or uplink scheduling within T-M-N slots for the network device, and when it is necessary to perform the uplink scheduling within the last M+N slots of the timer, the network device may schedule the PUSCH to the default BWP although the PUSCH is scheduled within the subsequent M+N slots.

According to the method of BWP switching in unpaired spectrum in the embodiments of the present disclosure, the network device may schedule the next PUSCH to the default BWP when the first DCI for scheduling the PDSCH the and second DCI for scheduling the PUSCH are not transmitted to the UE within the predetermined quantity of consecutive time-domain transmission units. As a result, it is able to prevent the uplink scheduling from being confused due to the switching of the BWP, thereby to ensure the normal uplink transmission of the UE during the switching of the BWP.

The method of BWP switching in unpaired spectrum has been described hereinabove in different scenarios, and the corresponding network device will be described hereinafter in conjunction with the drawings.

Figure 6:
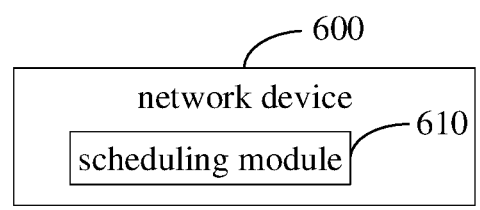
FIG. 6 is a schematic view showing the network device according to one embodiment of the present disclosure.

As shown in FIG. 6, the present disclosure further provides in some embodiments a network device 600 capable of implementing the above-mentioned method of BWP switching in unpaired spectrum, i.e., when first DCI for scheduling a PDSCH and second DCI for scheduling a PUSCH are not transmitted to a UE within a predetermined quantity of consecutive time-domain transmission units, scheduling a next PUSCH to a default BWP of the UE, with a same technical effect. The network device 600 may include a scheduling module 610 used to, when first DCI for scheduling a PDSCH and second DCI for scheduling a PUSCH are not transmitted to a UE within a predetermined quantity of consecutive time-domain transmission units, schedule a next PUSCH to a default BWP of the UE.

The predetermined quantity may be a difference between the quantity of time-domain transmission units in a timer of the UE and the quantity of time-domain transmission units in a time duration for waiting and transmitting the PUSCH.

The scheduling module 610 may include: a first scheduling sub-module used to, when the UE has been switched from a current BWP to the default BWP, transmit the second DCI for scheduling the next PUSCH to the default BWP to the UE through the default BWP; or a second scheduling sub-module used to transmit the second DCI for scheduling the next PUSCH to the default BWP to the UE through the current BWP.

The time-domain transmission unit may include one of a subframe, a slot, a mini-slot and a time-domain transmission symbol.

It should be appreciated that, according to the embodiments of the present disclosure, the network device may schedule the next PUSCH to the default BWP for the UE when the first DCI for scheduling the PDSCH the and second DCI for scheduling the PUSCH are not transmitted to the UE within the predetermined quantity of consecutive time-domain transmission units. As a result, it is able to prevent the uplink scheduling from being confused due to the switching of the BWP, thereby to ensure the normal uplink transmission of the UE during the switching of the BWP.

It should be further appreciated that, the above modules of the network device and the UE are divided merely on the basis of their logic functions, and in actual use, they may be completely or partially integrated into a physical entity, or physically separated from each other. All of these modules may be implemented by calling software through a processing element, or implemented in the form of hardware, or some of these modules may be implemented by calling software through a processing element and some of these modules may be implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the function of the determination module. The other modules may be implemented in a similar manner. All or parts of the modules may be integrated together or arranged separately. Here, the processing elements may each be an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more microprocessors, one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of System-On-a-Chip (SOC).

In order to achieve the above object in a better manner, the present disclosure further provides in some embodiments a network device which includes a processor, a memory, and a computer program stored in the memory and executed by the processor. The processor is used to execute the computer program, so as to implement the above-mentioned method of BWP switching in unpaired spectrum. The present disclosure further provides in some embodiments a computer-readable storage medium storing therein a computer program. The computer program is executed by a processor so as to implement the above-mentioned method of BWP switching in unpaired spectrum.

Figure 7:
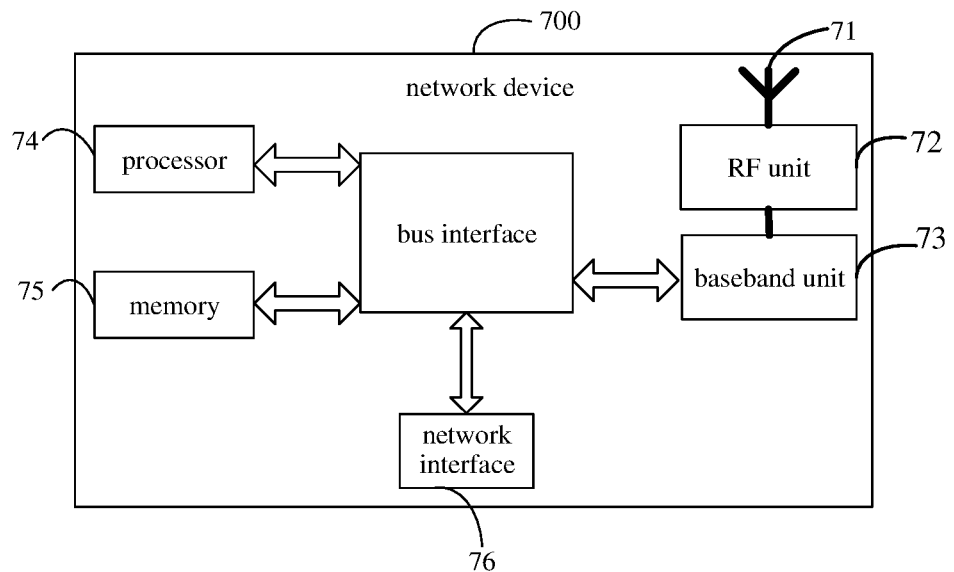
FIG. 7 is a block diagram of the network device according to one embodiment of the present disclosure.

To be specific, the present disclosure further provides in some embodiments a network device 700 which, as shown in FIG. 7, includes an antenna 71, a RF unit 72, and a baseband unit 73. The antenna 71 is connected to the RF unit 72. In an uplink direction, the RF unit 72 is used to receive information via the antenna 71, and transmit the received information to the baseband unit 73 for processing. In a downlink direction, the baseband unit 73 is used to process to-be-transmitted information, and transmit the processed information to the RF unit 72. The RF unit 72 is used to process the received information and transmit the processed information via the antenna 71.

A frequency band processing unit may be located within the baseband unit 73, so that the above method for the network device may be implemented within the baseband unit 73. The baseband unit 73 may include a processor 84 and a memory 75.

The baseband unit 73 may, e.g., include at least one baseband board on which a plurality of chips is located, as shown in FIG. 7. One chip may be, e.g., the processor 74 connected to the memory 75 and used to call a program stored in the memory 75 so as to perform operations for the network device in the above-mentioned method embodiments.

The baseband unit 73 may further include a network interface 76 used to exchange information with the RF unit 72. The network interface may be, e.g., a Common Public Radio Interface (CPRI).

Here, the processor may include merely one processor, or a plurality of processing elements. For example, the processor may be a CPU, an ASIC, or one or more ICs configured to implement the above-mentioned method for the network device, e.g., one or more microprocessors, one or more DSPs, or one or more FPGAs. The memory may include merely one memory, or a plurality of storage elements.

The memory 75 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 75 intends to include, but not limited to, the above-mentioned and any other appropriate memories.

To be specific, in the embodiments of the present disclosure, the network device may further include a computer program stored in the memory 75 and executed by the processor 74. The processor 74 is used to call the computer program in the memory 75 so as to achieve the functions of the modules in FIG. 6.

To be specific, the processor 74 is used to call the computer program, so as to, when first DCI for scheduling a PDSCH and second DCI for scheduling a PUSCH are not transmitted to a UE within a predetermined quantity of consecutive time-domain transmission units, schedule a next PUSCH to a default BWP of the UE.

The predetermined quantity may be a difference between the quantity of time-domain transmission units in a timer of the UE and the quantity of time-domain transmission units in a time duration for waiting and transmitting the PUSCH.

To be specific, the processor 74 is further configured to call the computer program so as to: when the UE has been switched from a current BWP to the default BWP, transmit the second DCI for scheduling the next PUSCH to the default BWP to the UE through the default BWP; or transmit the second DCI for scheduling the next PUSCH to the default BWP to the UE through a current BWP.

The time-domain transmission unit may include one of a subframe, a slot, a mini-slot and a time-domain transmission symbol.

The network device may be a Base Transceiver Station (BTS) in a Global System of Mobile Communication (GSM) system or a Code Division Multiple Access (CDMA) system, a Node B (NB) in a Wideband Code Division Multiple Access (WCDMA) system, an Evolved Node B (eNB, or eNodeB) in an LTE system, a relay or an access point, or a base station in a future 5G network, which will not be particularly defined herein.

According to the embodiments of the present disclosure, the network device may schedule the next PUSCH to the default BWP when the first DCI for scheduling the PDSCH the and second DCI for scheduling the PUSCH are not transmitted to the UE within the predetermined quantity of consecutive time-domain transmission units. As a result, it is able to prevent the uplink scheduling from being confused due to the switching of the BWP, thereby to ensure the normal uplink transmission of the UE during the switching of the BWP.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the units are provided merely on the basis of their logic functions. During the actual application, some components or units may be combined together or integrated into another system. Alternatively, some functions of the components or units may be omitted or not executed. In addition, the coupling connection, direct coupling connection or communication connection between the components or units may be implemented via interfaces, and the indirect coupling connection or communication connection between the devices or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include multiple instructions so as to enable computer equipment (e.g., a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile hard disk, a Read-Only Memory (ROM), a Random Access Memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be or may not be performed in a chronological order. In addition, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be or may not be performed in a chronological order. In addition, some steps may also be performed in parallel, or independently of each other.

The above embodiments are merely optional embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A method of Bandwidth Part (BWP) switching for a User Equipment (UE) in unpaired spectrum, comprising:
   if first Downlink Control Information (DCI) for scheduling a Physical Downlink Shared Channel (PDSCH) is detected, resetting a timer;
   if the first DCI for scheduling the PDSCH is not detected, resetting the timer when second DCI for scheduling a Physical Uplink Shared Channel (PUSCH) is detected; and
   when a reset timer is expired, switching a current BWP to a default BWP.

2. The method according to claim 1, wherein the resetting the timer in accordance with the detected second DCI for scheduling the PUSCH comprises:
   when the second DCI is detected and a difference between a current value of the timer and a time-out value of the timer is smaller than a time duration for waiting and transmitting the PUSCH, resetting the timer.

3. The method according to claim 1, wherein the resetting the timer comprises:
   rolling hack the current value of the timer a first predetermined quantity of time-domain transmission units, wherein the first predetermined quantity is a smaller one of a first value and a second value, the first value is a difference between the current value of the timer and an initial value of the timer, and the second value is the quantity of time-domain transmission units in the time duration for waiting and transmitting the PUSCH; or the first predetermined quantity is greater than or equal to a difference between the second value and a third value, and the third value is a difference between the current value of the timer and the time-out value of the timer.

4. The method according to claim 1, wherein the resetting the timer comprises when the timer is expired, roiling hack the time-out value of the timer a second predetermined quantity of time-domain transmission units, wherein the second predetermined quantity is greater than or equal to a difference between a second value and a third value, the second value is the quantity of time-domain transmission units in the time duration for waiting and transmitting the PUSCH, and the third value is a difference between the current value of the timer and the time-out value of the timer.

5. The method according to claim 3, wherein the second value is a sum of the quantity of time-domain transmission units between the second DCI and the scheduled PUSCH, and the quantity of time-domain transmission units occupied by the PUSCH.

6. The method according to claim 3, wherein the time-domain transmission unit comprises one of a suhframe, a slot, a mini-slot and a time-domain transmission symbol.

7. The method according to claim 1, wherein the resetting the timer in accordance with the detected second DCI for scheduling the PUSCH comprises: when the detected second DCI indicates that the PUSCH is mapped to the default BWP, keeping the timer going, and subsequent to keeping the timer going, the method further comprises: when the timer is expired, switching the current BWP to the default BWP.

8. A UE, comprising a processor, a memory, and a computer program stored in the memory and executed by the processor, wherein the processor is used to execute the computer program to:

if first Downlink Control Information (DCI) for scheduling a Physical Downlink Shared Channel (PDSCH) is detected, reset a timer;

if the first DCI for scheduling the PDSCH is not detected, the timer when second DCI for scheduling a PUSCH is detected; and when a reset timer is expired, switch a current BWP to a default BWP.

9. The LIE according to claim 8, wherein the processor is further used to execute the computer program to:

when the second DCI is detected and a difference between a current value of the timer and a time-out value of the timer is smaller than a time duration for waiting and transmitting the PUSCH, reset the timer.

10. The UE according to claim 8, wherein the processor is further used to execute the computer program to:

roll back the current value of the timer a first predetermined quantity of time-domain transmission units, wherein the first predetermined quantity is a smaller one of a first value and a second value, the first value is a difference between the current value of the timer and an initial value of the timer, and the second value is the quantity of time-domain transmission units in the time duration for waiting and transmitting the PUSCH; or the first predetermined quantity is greater than or equal to a difference between the second value and a third value, and the third value is a difference between the current value of the timer and the time-out value of the timer.

11. The according to claim 8, wherein the processor is further used to execute the computer program to:

when the timer is expired, roll back the time-out value of the timer a second predetermined quantity of time-domain transmission units, wherein the second predetermined quantity is greater than or equal to a difference between a second value and a third value, the second value is the quantity of time-domain transmission units in the time duration for waiting and transmitting the PUSCH, and the third value is a difference between the current value of the timer and the time-out value of the timer.

12. The UE according to claim 10, wherein the second value is a sum of the quantity of time-domain transmission units between the second DCI and the scheduled PUSCH, and the quantity of time-domain transmission units occupied by the PUSCH.

13. The UE according to claim 10, wherein the time-domain transmission unit comprises one of a subframe, a slot, a mini-slot and a time-domain transmission symbol.

14. The UE according to claim 8, wherein the processor is further used to execute the computer program to:

when the detected second DCI indicates that the PUSCH is mapped to the default BWP, keep the timer going, and the processor is further used to execute the computer program to: subsequent to keeping the timer going, when the timer is expired, switch the current BWP to the default BWP.

15. A computer-readable storage medium storing therein a computer program, wherein the computer program is used to be executed by a computer program to implement a method of BWP switching for a UE in unpaired spectrum comprising:

if first Downlink Control information (DCI) for scheduling a Physical Downlink Shared Channel (PDSCH) is detected, resetting a timer;

if the first DCI for scheduling the PDSCH is not detected, resetting the timer when second DCI for scheduling a PUSCH is detected; and when a reset timer is expired, switching a current BWP to a default BWP.

16. The computer-readable storage medium according to claim 15, wherein the resetting the timer in accordance with the detected second DCI for scheduling the PUSCH comprises:

when the second DCI is detected and a difference between a current value of the timer and a time-out value of the timer is smaller than a time duration for waiting and transmitting the PUSCH, resetting the timer.

17. The computer-readable storage medium according to claim 15, wherein the resetting the timer comprises:

rolling back the current value of the timer a first predetermined quantity of time-domain transmission units, wherein the first predetermined quantity is a smaller one of a first value and a second value, the first value is a difference between the current value of the timer and an initial value of the timer, and the second value is the quantity of time-domain transmission units in the time duration for waiting and transmitting the PUSCH; or the first predetermined quantity is greater than or equal to a difference between the second value and a third value, and the third value is a difference between the current value of the timer and the time-out value of the timer.

18. The computer-readable storage medium according to claim 15, wherein the resetting the timer comprises:
when the timer is expired, rolling back the time-out value of the timer a second predetermined quantity of time-domain transmission units,
wherein the second predetermined quantity is greater than or equal to a difference between a second value and a third value, the second value is the quantity of time-domain transmission units in the time duration for waiting and transmitting the PUSCH, and the third value is a difference between the current value of the timer and the time-out value of the timer.

19. The computer-readable storage medium according to claim 17, wherein the second value is a sum of the quantity of time-domain transmission units between the second DCI and the scheduled PUSCH, and the quantity of time-domain transmission units occupied by the PUSCH.

20. The computer-readable storage medium according to claim 17, wherein the time-domain transmission unit comprises one of a subframe, a slot, a mini-slot and a time-domain transmission symbol.

* * * * *